(12) United States Patent
Köster et al.

(10) Patent No.: US 7,582,036 B2
(45) Date of Patent: Sep. 1, 2009

(54) ACTUATING DEVICE

(75) Inventors: Andreas Köster, Essen (DE); Heinrich Dismon, Gangelt (DE); Stefan Vitt, Neuss (DE)

(73) Assignee: Pierburg GmbH, Neuss (DE)

( * ) Notice: Subject to any disclaimer, the term of this patent is extended or adjusted under 35 U.S.C. 154(b) by 332 days.

(21) Appl. No.: 10/595,322

(22) PCT Filed: Oct. 4, 2004

(86) PCT No.: PCT/EP2004/011047

§ 371 (c)(1),
(2), (4) Date: Apr. 7, 2006

(87) PCT Pub. No.: WO2005/036030

PCT Pub. Date: Apr. 21, 2005

(65) Prior Publication Data

US 2006/0283278 A1    Dec. 21, 2006

(30) Foreign Application Priority Data

Oct. 7, 2003   (DE) .......................... 103 46 403

(51) Int. Cl.
 *F16H 48/06* (2006.01)
(52) U.S. Cl. ..................................... 475/149
(58) Field of Classification Search .............. 475/149
See application file for complete search history.

(56) References Cited

U.S. PATENT DOCUMENTS

| | | | | |
|---|---|---|---|---|
| 2,499,928 A | * | 3/1950 | Misic | ........................ 310/50 |
| 3,267,311 A | | 8/1966 | Lamparty et al. | |
| 5,704,864 A | * | 1/1998 | Yanagisawa | ................ 475/149 |
| 5,777,412 A | * | 7/1998 | Yamamoto | ................... 310/83 |
| 6,007,446 A | * | 12/1999 | Lang et al. | ................... 475/149 |
| 6,031,308 A | * | 2/2000 | Kinoshita et al. | ............ 310/83 |
| 6,955,390 B2 | * | 10/2005 | Rigorth et al. | ........... 296/146.4 |

FOREIGN PATENT DOCUMENTS

| | | |
|---|---|---|
| DE | 1017697 | 9/1955 |
| DE | 43 24 876 A1 | 2/1995 |
| DE | 4444136 A1 | 6/1996 |
| DE | 100 47 308 A1 | 5/2002 |
| DE | 102 01 141 A1 | 8/2003 |
| EP | 0 428 895 A2 | 5/1991 |

OTHER PUBLICATIONS

International Search Report issued in corresponding application No. PCT/EP2004/011047 completed Dec. 1, 2004 and mailed Dec. 9, 2004.
Office Action in corresponding German application No. 103 46 403.4 dated Oct. 2, 2006.

* cited by examiner

*Primary Examiner*—Ha D. Ho

(57) ABSTRACT

An actuating device including a housing that is closed by a cover in such a way that both an electric motor and a gearbox unit are completely enclosed. An internal gear segment, arranged on an output shaft in a rotationally fixed manner, is positioned on a borehole of the cover. An axle on which a double toothed gear is arranged is then mounted on the output side, an a pocket hole in the cover. This reduces the overall length, as well as the number of components and the cost.

10 Claims, 1 Drawing Sheet

ACTUATING DEVICE

This is a National Phase Application in the United States of International Patent Application No. PCT/EP2004/011047 filed Oct. 4, 2004, which claims priority on German Patent Application No. 103 46 403.4, filed Oct. 7, 2003. The entire disclosures of the above patent applications are hereby incorporated by reference.

BACKGROUND OF THE INVENTION

The invention relates to an actuating device with a drive unit that features an electric motor, which motor is arranged in a housing and drives a drive shaft, and with a gear unit that features a drive gear arranged on the drive shaft at least in a rotationally fixed manner, which drive gear in a first gear stage meshes with at least one planetary gear that is embodied as a double toothed gear and is supported on an axle in a fixed position and so that it can pivot, whereby the drive gear drives the larger gear wheel of the double toothed gear, and the smaller gear wheel, which faces the direction of the output side, in a second gear stage meshes with an internally toothed gear or gear segment that is arranged on an output shaft in an at least rotationally fixed manner, so that the output shaft can be driven via the two gear stages.

In DE 100 47 308 A1 a two-stage gear arrangement for an actuating device is described that features a drive shaft on which a drive gear is arranged and that is in operative connection with a two-stage gear on whose output side a centrally arranged output shaft is arranged. In detail, the transfer from the drive gear takes place via three double toothed gears, whose larger gear wheel meshes with the drive gear and whose smaller gear wheel meshes with an internal gear arranged on the output shaft. The entire two-stage gear arrangement is situated in a housing totaling three parts, whereby the first essentially plate-shaped part lying nearest to the drive motor features the bearing of the drive shaft as well as of the axles for the double toothed gears. In a second housing part, the three double toothed gears are arranged in the form of a housing cage whose axles are supported in the housing cage at their second end. In addition this housing cage also features a first bearing point for the output shaft, on which an internal gear is arranged that meshes with the respectively smaller gear wheels of the double toothed gears. This gear unit is essentially tightly closed by a third housing part that is placed on the second part and features a second bearing point for the output shaft.

The disadvantage of such a form of embodiment is the large number of components to be used and assembled, whose sizes must be matched to one another very precisely. This results in increased assembly and production costs, since the respective axles of the double toothed gears, the drive shaft, and the output shaft must be matched to one another very precisely, that is to say a smaller tolerance must be maintained with respect to their parallel position to one another.

BRIEF SUMMARY OF THE INVENTION

It is therefore the object of the invention to realize an actuating device with a gear unit in which both the assembly cost and the number of components are to be distinctly reduced, and whereby reliable function of the actuating device is ensured, so that production and assembly costs are reduced.

This object is achieved in that a cover is fixed to the housing that tightly closes the drive unit and the gear unit on the outside and that is embodied in such a way that the bearing of the outwards-facing output shaft is embodied on one side and is arranged in the cover. Through such an embodiment according to the invention, the entire housing can be embodied in only two parts, since the necessity of a second bearing point of the output shaft and thus the necessity of the gear cage is eliminated. This results in easier access during assembly and a reduction in the number of components and the overall length of the gear unit. The bearing point of the output shaft in the cover is embodied sufficiently long to enable acceptance of any transverse forces that occur.

In a further form of embodiment, the gear unit features only one planetary gear that is arranged on an axle so that it can pivot, which axle is fixed to and supported by a motor end shield, in which shield the gear-side bearing of the motor shaft serving as drive shaft is also arranged. The motor end shield can be connected firmly to the housing of the electric motor. In addition to the consequent reduction in the number of components needed, the fixing of the motor end shield to the housing causes an improvement in the dynamic strength of the actuating device. Moreover, assembly is distinctly facilitated, since the components can simply be placed on top of one another. Through the single double toothed gear, the demands on the manufacturing tolerances in particular of the parallelism of the axles are reduced, so that production costs can be saved.

In a preferred form of embodiment, the axle of the double toothed gear is supported in the cover on the side opposite the motor end shield and the internal gear or internal gear segment features a corresponding recess, by means of which occurring transverse forces in the gear and in particular at the double toothed gear can be counteracted by the two-sided bearing of the axle, without having to use additional components.

The described forms of embodiment feature a low number of components, so that the functionality of known electric motor gears is maintained a reduced overall length. The entire actuating device can be mounted individually in the housing, that is to say first the motor can be inserted, whereupon the motor end shield can be fixed to the housing and thus to the motor. In the further steps the gears can be inserted and in a last step the entire unit can be closed by means of the cover. Such an assembly is very simple to carry out and due to the integrated components and the reduced cost of components, requires only a small number of assembly steps. Costs can also be reduced during production, not least due to the additional purchase of individual parts not additionally matched to one another.

BRIEF DESCRIPTION OF THE SEVERAL VIEWS OF THE DRAWINGS

An actuating device according to the invention is shown in the drawings and is described below.

DETAILED DESCRIPTION OF THE ILLUSTRATIVE EMBODIMENTS

Figure 1:
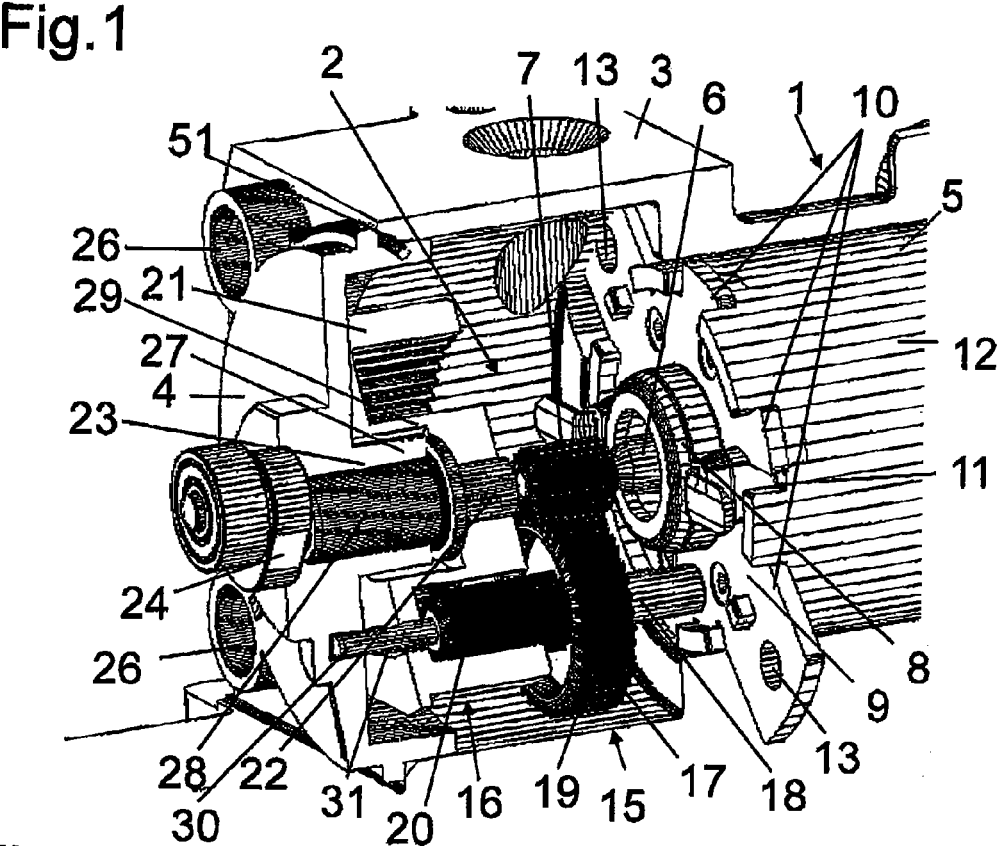
FIG. 1 shows in perspective view a section of an actuating device according to the invention in the assembled state with a cut-away housing.
Figure 2:
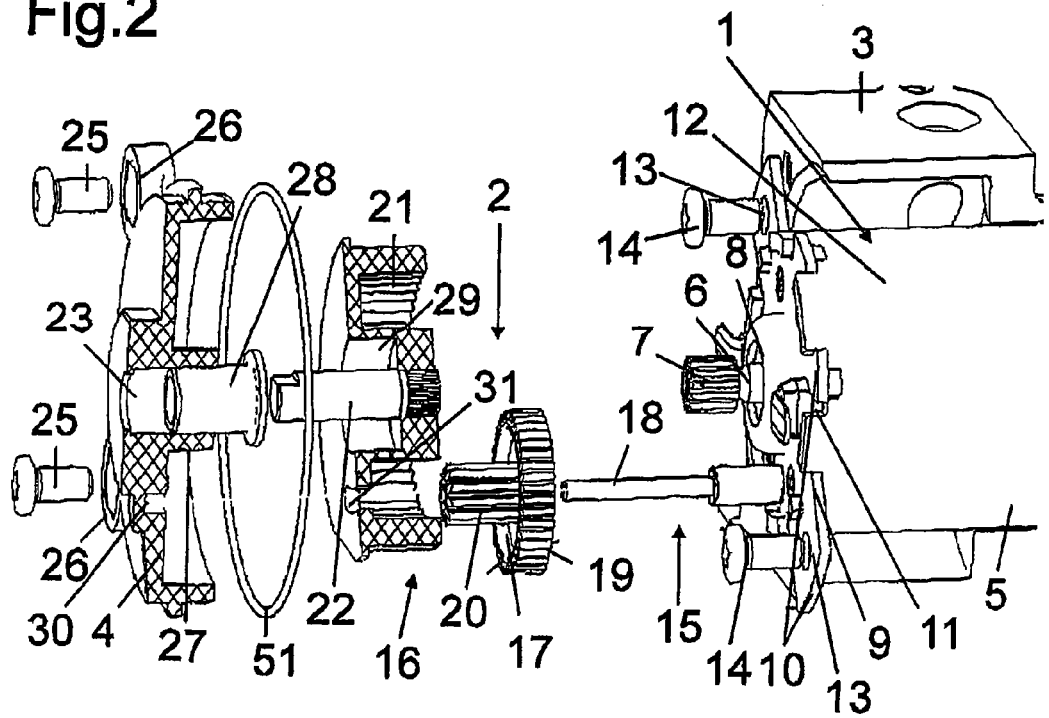
FIG. 2 shows the section of the actuating device according to the invention from FIG. 1 in an exploded representation.

The actuating device according to the invention shown in FIG. 1 comprises a drive unit 1 and a gear unit 2, which are arranged in a housing 3. The housing 3 is essentially embodied in the shape of a pot and is tightly closed on the output side by a cover 4 with the interposition of a seal 51.

The drive unit 1 comprises an electric motor 5, on whose drive shaft 6 a drive gear 7 is arranged at least in a rotationally fixed manner. The drive shaft 6 is supported via a bearing point 8 arranged in a motor end shield 9. This motor end shield 9 features protuberances 10 that engage in corresponding recesses 11 of a pole tube 12 of the motor 5, so that the pole tube 12 is arranged in a rotationally fixed manner to the gear unit 2. Some of these protuberances 10 also feature boreholes 13, via which the motor end shield 9 and thus the electric motor 5 can be fixed to the housing 3 by means of screws 14. When a brushed motor is used, it is moreover possible to attach holders for commutator brushes and the associated springs to the motor end shield 9. In any case, when an electronically commutated electric motor is used, connecting lugs for the voltage feed can also be realized via the motor end shield 9.

The gear unit 2 comprises a first gear stage 15 and a second gear stage 16. The first gear stage 15 again comprises the already mentioned drive gear 7, which meshes with a planetary gear 17 in the form of a double toothed gear. This double toothed gear 17 is arranged on an axle 18 so that it can pivot, which axle is again fixed to the motor end shield 9 on the motor side. A larger gear wheel 19 of the double toothed gear 17 is thus driven by the drive gear 7, by means of which a smaller gear wheel 20 of the double toothed gear 17 is also correspondingly caused to rotate. This smaller gear wheel 20 is the first part of the second gear stage 16 and meshes with an internally toothed gear embodied as an internal gear segment 21 that is arranged on an output shaft 22 in an at least rotationally fixed manner. The output shaft 22 extends outwards through a central opening 23 in the cover and in the present Example drives an eccentric 24, which for example can be in operative connection with a valve rod of an exhaust gas recirculation valve.

The cover 4 is fixed to the housing 3 via screws 25, whereby corresponding eyes 26 are embodied on the cover 4 for this purpose. The central opening 23 of the cover 4, through which the output shaft 22 extends, is embodied such that a long shoulder 27 extending in the axial direction is formed in the cover, which shoulder features the opening or borehole 23. In this borehole 23 a bearing 28 is arranged in which the output shaft 22 with the internal gear segment 21 is supported. In order to be able to embody this bearing 28 with sufficient length, an annular recess 29 corresponding to the shoulder 27 is embodied on the internal gear segment 21. Moreover the cover 4 features a pocket hole, which serves as a second bearing point 30 for the axle 18 on which the double toothed gear 17 is arranged. Accordingly the axle 18 must be able to extend through the internal gear segment 21, so that on the internal gear segment 21 a recess 31 is embodied that is arranged in partially annular form at a constant radial distance from the output shaft 22 and whose height essentially corresponds to the diameter of the axle 18. Over which angle at circumference this recess 31 runs, is dependent on the actuating angle of the actuating device to be fulfilled respectively.

The assembly can then take place in a simple manner in that first the motor 5 is inserted into the housing 3 and is fixed to the housing 3 by the corresponding arrangement and fixing of the motor end shield 9. Then the double toothed gear 17 can be pushed onto the axle 18 already fixed to the motor end shield 9, so that the larger gear 19 meshes with the already preassembled drive gear 7. After the output shaft 22 and the bearing 28 have been fixed to the cover 4, this cover with the internal gear segment 21 preassembled on the output shaft 22 can be placed on the housing 3 in such a way that the axle 18 engages in the pocket hole 30 and simultaneously the internal gear segment 21 also engages automatically with the teeth of the smaller gear 20. This takes place with the interposition of the seal 51, so that the cover 4 can now be screwed to the housing 3.

When the electric motor 5 is driven, the rotation of the drive shaft 6 of the electric motor 5 is then transferred geared-down to the output shaft 22 via the two gear stages 15, 16.

In comparison with known actuating devices, this embodiment according to the invention needs a shorter overall length due to the elimination of the gear cage, as well as a reduction in the number of components in particular due to the use of only one double toothed gear with simultaneous reliability of the function. By reducing the assembly steps needed, the assembly is distinctly facilitated. This results in an optimization of the costs. The production costs also fall due to the smaller number of components and the lower tolerances to be maintained.

It is clear that such an actuating device can be used not only for an eccentric drive as shown in the exemplary embodiment, but also for any other rotatory drive with required gear ratio reduction, in particular in combustion engines.

The invention claimed is:

1. Actuating device comprising:
    a drive unit comprising an electric motor, which motor is arranged in a housing and directly drives a drive shaft;
    a gear unit comprising
        a drive gear driven by the drive shaft and arranged on the drive shaft at least in a rotationally fixed manner,
        one or more planetary gears, each planetary gear comprising a double gear having a larger gear wheel and a smaller gear wheel, supported on an axle in a fixed position and so that the planetary gear can pivot, and
        an internally toothed gear or internally toothed gear segment that is arranged on an output shaft in an at least rotationally fixed manner,
        wherein the drive gear in a first gear stage meshes with at least one planetary gear,
        whereby the drive gear drives the larger gear wheel of the double gear, and the smaller gear wheel, which faces a direction of an output side, in a second gear stage meshes with the internally toothed gear or internally toothed gear segment, so that the output shaft can be driven via the two gear stages; and
    a cover fixed to the housing of the drive unit and the outside of the gear unit, arranged so that a bearing of the output shaft is arranged in the cover.

2. Actuating device according to claim 1, wherein said at least one planetary gear of said gear unit features only one planetary gear, and
    further comprising a motor end shield which supports said axle of said planetary gear and to which said axle is fixed, and
    still further comprising a gear-side bearing of said drive shaft arranged in the shield,
    wherein the shield is arranged to be firmly connectable to said housing of said electric motor.

3. Actuating device according to claim 2, wherein said axle is supported in said housing on a side opposite said motor end shield, and said internally toothed gear or gear segment comprises a corresponding recess for said axle.

4. The actuating device of claim 1,
    wherein the axle lies between the output shaft and internal teeth of the internally toothed gear or gear segment.

5. The actuating device of claim 2,
    wherein the axle lies between the output shaft and internal teeth of the internally toothed gear or gear segment.

6. The actuating device of claim 3,
wherein the axle lies between the output shaft and internal teeth of the internally toothed gear or gear segment.

7. The actuating device of claim 1,
wherein the output shaft has only a single bearing, the bearing being arranged in the cover.

8. The actuating device of claim 2,
wherein the output shaft has only a single bearing, the bearing being arranged in the cover.

9. The actuating device of claim 3,
wherein the output shaft has only a single bearing, the bearing being arranged in the cover.

10. An actuating device comprising:
a drive unit comprising an electric motor having a drive shaft, wherein the motor is arranged in a housing;
a gear unit comprising
   a drive gear on the drive shaft at least in a rotationally fixed manner,
   one or more planetary gears, each planetary gear comprising a double gear having a larger gear wheel and a smaller gear wheel, supported on an axle in a fixed position and so that the planetary gear can pivot, and
   an internally toothed gear or internally toothed gear segment that is arranged on an output shaft in an at least rotationally fixed manner,
   wherein the drive gear in a first gear stage meshes with at least one planetary gear,
   whereby the drive gear drives the larger gear wheel of the double gear, and the smaller gear wheel, which faces a direction of an output side, in a second gear stage meshes with the internally toothed gear or internally toothed gear segment, so that the output shaft can be driven via the two gear stages; and
a cover fixed to the housing of the drive unit and the outside of the gear unit, arranged so that a bearing of the output shaft is arranged in the cover.

* * * * *